United States Patent [19]
Buchwald et al.

[11] Patent Number: 4,751,439
[45] Date of Patent: Jun. 14, 1988

[54] MULTIPLE CHOPPER SPEED CONTROL SYSTEM FOR COMPOUND MOTOR

[75] Inventors: Frank S. Buchwald, Beachwood; William Pickering, University Heights, both of Ohio

[73] Assignee: Caterpillar Industrial Inc., Mentor, Ohio

[21] Appl. No.: 495,284

[22] Filed: May 16, 1983

[51] Int. Cl.⁴ .............................................. H02P 5/04
[52] U.S. Cl. ..................................... 318/305; 318/338
[58] Field of Search ............... 318/139, 332, 338, 259, 318/341, 493, 305; 310/180, 184

[56] References Cited

U.S. PATENT DOCUMENTS

| | | | |
|---|---|---|---|
| 2,853,670 | 9/1958 | Johnstone | 318/532 X |
| 3,601,673 | 8/1971 | Mason | 318/317 X |
| 4,080,556 | 3/1978 | Buchwald et al. | 318/526 |
| 4,322,667 | 3/1982 | Ohba | 318/338 |
| 4,408,147 | 10/1983 | Gabel | 318/493 |

*Primary Examiner*—Ulysses Weldon
*Attorney, Agent, or Firm*—Stephen L. Noe

[57] ABSTRACT

A compound-motor speed control system for a battery-powered vehicle (86) wherein the series winding (14) and the shunt winding (16) of the motor (12) are magnetically linked in energy transfer relation. A first current switch (18) is connected in series with the series winding (14) and the armature (15) and a second current switch (20) is connected in series with the shunt winding (16). A digitally-implemented speed control system (24) responds to the speed selection settings of an analog device (64) to operate the first switch intermittently while holding the second switch closed over a lower speed range, and to operate the second switch intermittently while holding the first switch closed over a higher speed range.

7 Claims, 3 Drawing Sheets

| $I_3$ | $I_2$ | $I_1$ | $I_0$ | | $O_4$ | $O_3$ | $O_2$ | $O_1$ | $O_0$ | S.F PULSING | FIELD PLSG. ARMATURE |
|---|---|---|---|---|---|---|---|---|---|---|---|
| 0 | 0 | 0 | 0 | (OFF) | 1 | 0 | 0 | 0 | 0 | ON 100% | OFF |
| 0 | 0 | 0 | 1 | | 1 | 0 | 0 | 1 | 0 | " | 12.5% ON |
| 0 | 0 | 1 | 0 | | 1 | 0 | 1 | 0 | 0 | " | 25.0% ON |
| 0 | 0 | 1 | 1 | | 1 | 0 | 1 | 1 | 0 | " | 37.5% ON |
| 0 | 1 | 0 | 0 | | 1 | 1 | 0 | 0 | 0 | " | 50.0% ON |
| 0 | 1 | 0 | 1 | | 1 | 1 | 0 | 1 | 0 | " | 62.5% ON |
| 0 | 1 | 1 | 0 | | 1 | 1 | 1 | 0 | 0 | " | 75.0% ON |
| 0 | 1 | 1 | 1 | | 1 | 1 | 1 | 1 | 0 | " | 87.5% ON |
| 1 | 0 | 0 | 0 | | 1 | 1 | 1 | 1 | 1 | 93.75% ON | 100% ON |
| 1 | 0 | 0 | 1 | | 0 | 1 | 1 | 0 | 0 | 75.0% ON | " |
| 1 | 0 | 1 | 0 | | 0 | 1 | 0 | 1 | 0 | 62.5% ON | " |
| 1 | 0 | 1 | 1 | | 0 | 1 | 0 | 0 | 0 | 50.0% ON | " |
| 1 | 1 | 0 | 0 | | 0 | 0 | 1 | 1 | 0 | 37.5% ON | " |
| 1 | 1 | 0 | 1 | | 0 | 0 | 1 | 0 | 0 | 25.0% ON | " |
| 1 | 1 | 1 | 0 | | 0 | 0 | 0 | 1 | 0 | 12.5% ON | " |
| 1 | 1 | 1 | 1 | (MAX) | 0 | 0 | 0 | 0 | 0 | OFF | " |

MULTIPLE CHOPPER SPEED CONTROL SYSTEM FOR COMPOUND MOTOR

DESCRIPTION

1. Technical Field

This invention relates to speed control for dc motors of the compound winding type and particularly to a speed control system for a compound motor in which the series winding is pulsed for low speed, high torque operation and the shunt winding is pulsed for high speed, low torque operation.

2. Background Art

It is known to employ a dc compound motor in a battery powered vehicle. U.S. Pat. No. 4,142,135, "Fork Lift Truck With Balance Weight Using Batteries as Power Source", issued Feb. 27, 1979, to Fumita, discloses an arrangement comprising an accelerator controlled variable resistor in the shunt field circuit of compound motor.

It is also known to employ choppers in the armature and shunt circuits of a conventional separately-excited dc motor. U.S. Pat. No. 3,378,746, "Motor Control for Controlling Both Armatures and Field Circuits", issued Apr. 16, 1968, to Weiser, discloses the use of a dc chopper and a current measuring circuit in the armature circuit of a separately-excited dc motor and a dc chopper in the separately-excited shunt field circuit. A similar if not identical arrangement is described in the copyrighted SAE Paper No. 800,058, "The Drive System of the DOE Near-Term Electric Vehicle (ETV-1)", by James W. A. Wilson, 0148-7191/80/02255-0058, published in 1980.

There is, however, no known prior art teaching of the use of multiple choppers in a progressively operated speed control system for a compound motor of the type having magnetically linked shunt and series field windings.

DISCLOSURE OF THE INVENTION

The present invention provides a multiple range speed control system for a compound motor of the type having magnetically linked series field and shunt field windings, as applied, for example, to a battery powered vehicle. Briefly defined, the invention comprises a first current switch in series with the series winding of a compound motor, a second current switch in series with the shunt winding of the compound motor, and a speed control means for controllably opening and closing the first and second current switches and operable over a first range in which the first switch is intermittently opened and closed in the manner of a chopper while the second switch is constantly closed, and operable over a second further range in which the first switch is constantly closed and the second switch is intermittently opened and closed in the manner of a chopper. The invention, thus, provides the high torque, low speed characteristics of a series motor together with high efficiency due to low electrical losses arising out of the energy transfer relationship between the magnetically linked series and shunt windings of a compound motor.

BEST MODE FOR CARRYING OUT THE INVENTION

Figure 1:
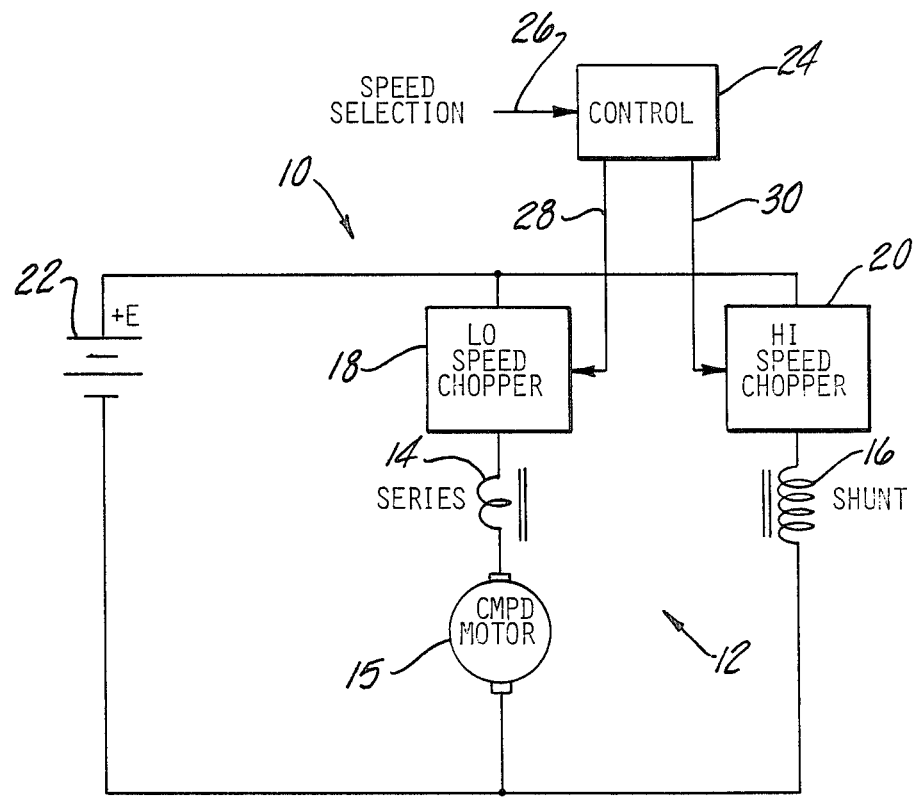
FIG. 1 is a simplified block diagram of a speed control system embodying the invention.

Referring to FIG. 1, a speed control circuit 10 for a compound motor 12 is shown. Motor 12 comprises an armature 15, a series winding 14 and a shunt winding 16, such windings being wound on a common magnetic frame so as to be linked in magnetic energy transfer relation. A chopper 18 is connected in series circuit with the series field winding 14 and armature 15. A second chopper 20 is connected in series circuit with the shunt field winding 16. Both series and shunt circuits are connected to receive dc power from a battery 22. A control circuit 24 receives speed selection input signals at 26 and has a first output 28 connected to the chopper 18 to operate the chopper in an intermittently "on" and "off" mode for low speed operation. Control 24 includes a second output 30 connected to the chopper 20 to operate the chopper in an intermittent "on" and "off" mode during high speed operating conditions. When the output 28 is intermittent, output 30 is in a constant state to maintain the chopper 20 in a closed circuit condition; conversely, when output 30 is intermittent, output 28 is constant to maintain chopper 18 in a closed circuit condition.

Figure 2:
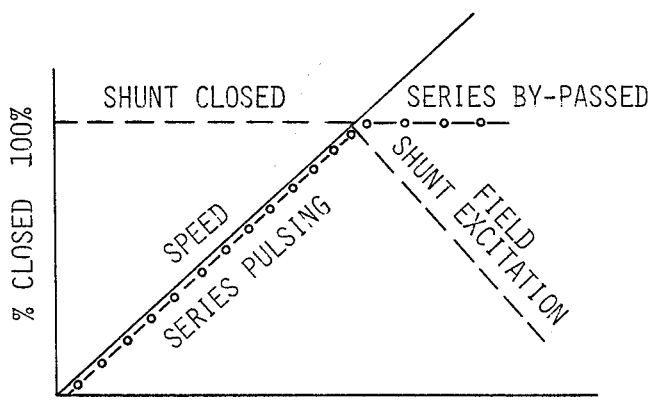
FIG. 2 is a chart of operating conditions over a multi-range speed characteristic of the circuit of FIG. 1.

The resulting mode of operation is diagrammatically represented in FIG. 2. As speed increases from zero, the shunt circuit controlled by chopper 20 is full "on" and the series circuit controlled by chopper 18 is pulsed in a time-duration-modulation mode wherein the percentage of "on" or closed circuit time increases with speed. At a predetermined mid-range speed, the series circuit controlled by chopper 18 is held constantly in the closed circuit condition and the shunt circuit controlled by chopper 20 is thereafter operated in a pulse duration modulation mode wherein the percentage of "on" or closed circuit time is progressively decreased.

Figure 3:
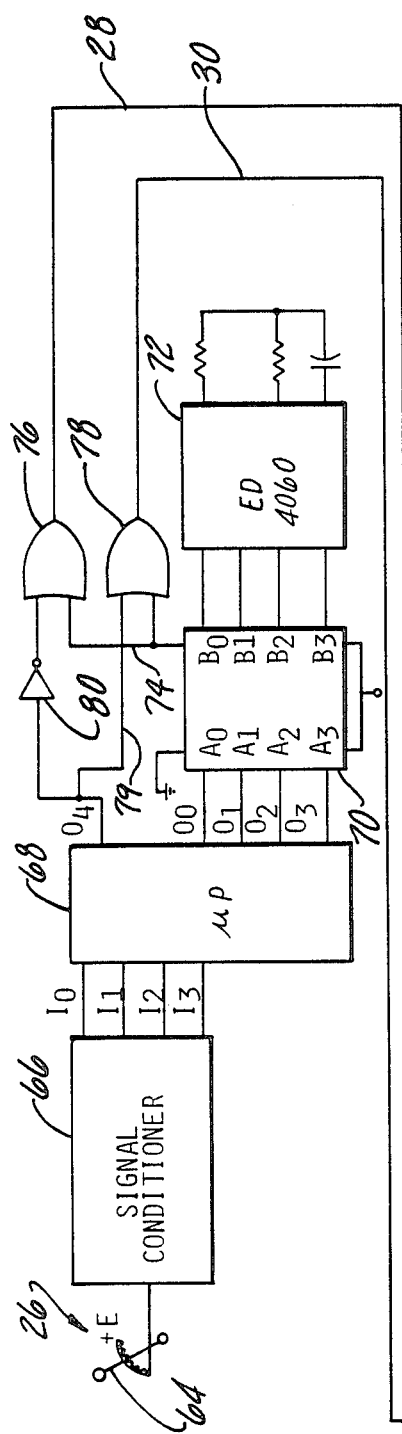
FIG. 3 is a detailed circuit diagram of a compound motor speed control circuit embodying the invention.
Figure 3:
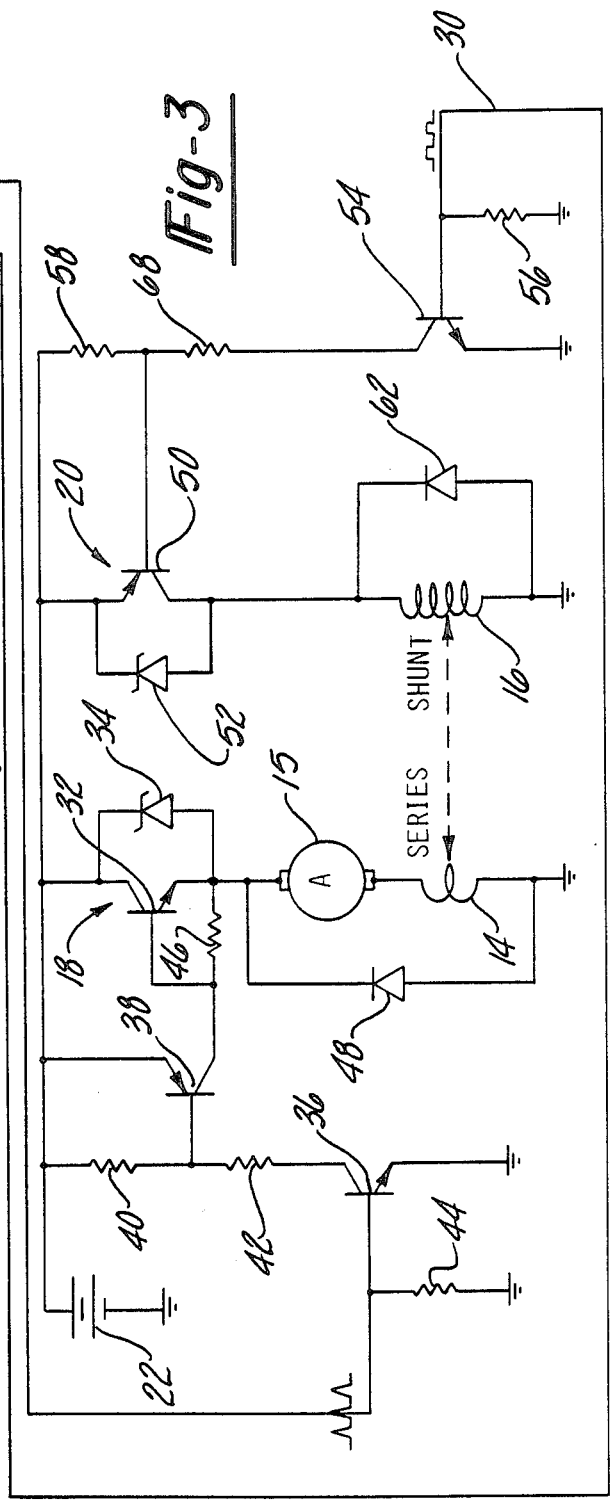

Referring now to FIG. 3, a detailed description of a full schematic circuit diagram is given. Reference characters common to those of FIG. 1 are used to designate the same basic circuit elements or assemblies.

In FIG. 3, chopper 18 is shown connected in series with the armature 15 of the compound motor 12 and the series field winding 14. The chopper 18 comprises a transistor switch 32 operated in a saturated switch mode between "on" and "off" conditions and having a parallel connected suppression diode 34. The state of the transistor 32 is controlled by an amplifier comprising transistors 36 and 38 of opposite conductivity type. The emitter circuit of the transistor 38 is connected to the 48-volt battery 22 along with the collector circuit of the chopper transistor 32. Bias resistors 40 and 42 are connected to the base of the transistor 38 and in the collector circuit of the transistor 36. The emitter of the transistor 36 is connected to ground and the base circuit is connected to receive a control signal on the input line 28. A resistor 44 connects the base circuit to ground for biasing purposes. A resistor 46 is connected between the base and emitter circuits of the transistor 32 for turnoff purposes. A flyback diode 48 is connected around the series winding 14.

The shunt circuit chopper 20 comprises a pnp transistor 50, the emitter of which is connected to the 48-volt battery 22 and the collector of which is connected directly in series with the shunt winding 16. A flyback diode 52 is connected in parallel with the emitter-collector circuit of the transistor 50. The transistor 50 is also operated in a saturated "on" vs. "off" mode by a control transistor 54. The collector circuit of the transistor 54 is connected to the base of transistor 50 and to the 48-volt battery 22 through a series resistor combination 58,60. A base bias resistor 56 is provided for the transistor 54. A flyback diode 62 is connected in parallel with the shunt winding 16. A control transistor 54 is connected to receive signals from the control circuit 24 on input line 30.

Referring now to the control circuit 24, a speed selection signal on a line 26 is provided by a transducer device 64, for example a potentiometer type speed control, to a signal conditioner 66 which may include an analog to a digital converter. The signal conditioner 66 provides a four-bit digital signal $I_0$–$I_3$ to a microprocessor unit 68. This unit 68 includes a lookup table and is programmed to provide varying five-bit outputs $O_0$–$O_4$ in response to the instantaneous value of a changing input signal and may be implemented using a conventional read only memory having a fixed signal transfer characteristic hereinafter detailed with reference to FIG. 4. Four of the microprocessor outputs $O_0$–$O_3$ are connected to one side of a four-bit comparator 70. The other side of the comparator 70 is connected to receive four-bit digital signals from a free-running oscillator circuit 72. The function of the comparator 70 and the oscillator 72 is to provide a fixed-frequency, time-duration-modulated signal which selectably controls the choppers 18,20 in a time-duration-modulated mode, the selection of the particular chopper to be time modulated being determined by the setting of device 64 and the combination of signals on the inputs 28,30.

The operation of the oscillator 72 and the comparator 70 to provide a time-duration-modulated output on the line 74 is as follows. The oscillator is free-running and provides four-bit digital combinations 0000 to 1111 in a digitally-consecutive sequence and at a fixed rate. When the oscillator 72 reaches 1111, it restarts at 0000 and repeats. These digital numbers are input at $B_0$–$B_3$ of the comparator 70. The numbers which are input to the comparator 70 at $A_0$–$A_3$ represent the selected speed settings. The signal level on the output line 74 is high as long as the "B" number is less than the "A" number and vice versa. Therefore, the output 74 starts out high at the oscillator count 0000 and changes at the point in time where "B" becomes greater than "A". It is apparent that the changeover point is a function of the "A" number which, in turn, is a function of the speed setting.

The time-duration-modulated signal on the output 74 of the comparator 70 is connected commonly to a first input of each of a pair of OR gates 76 and 78. The output of the gate 76 is connected to the base or input of the control transistor 36 which, as previously described, is connected to control the operating condition of the chopper transistor 32. The output of the gate 78 is connected via a line 30 to the base of the transistor 54 which controls the operating condition of the chopper transistor 50. As previously mentioned, only one chopper is pulse operated at a time.

For steering the time-duration-modulated output of the four-bit comparator 70 to one or the other of the gates 76 and 78, the fifth output $O_4$ of the microprocessor unit 68, which functions as a hi-lo range control signal, is connected directly to a second input of the gate 78 via line 79 and through an inverter 80 to a second input of the gate 76.

Figures 4, 5:
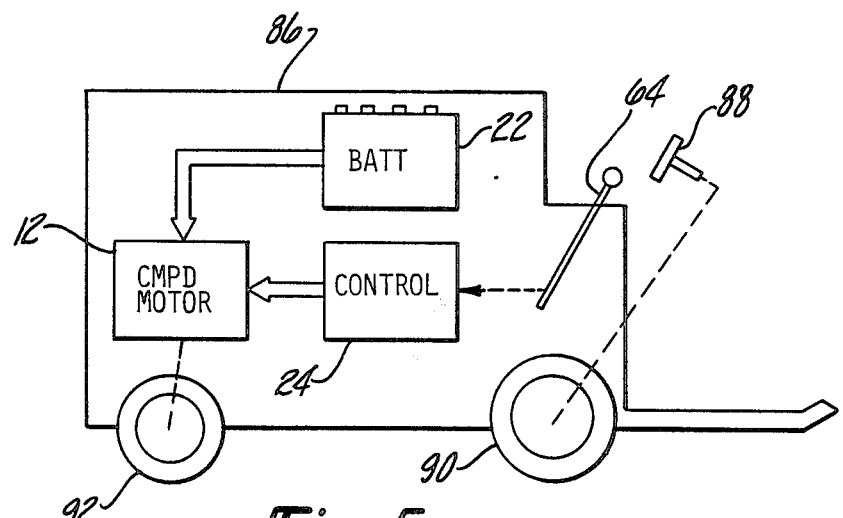
FIG. 4 is a table of signal conditions existing in the circuitry of FIG. 3; and, FIG. 5 is a simplified drawing of a battery powered electric vehicle employing the invention of FIGS. 1 through 4.

The operation of the circuit of FIG. 3 is best understood by reference to the table of FIG. 4. The signal condition for $I_0$–$I_3$ over a zero to maximum speed range are shown in the left-hand series of columns. The outputs of the microprocessor 68 over the same speed range are shown in the center columns. For the low speed range, the outputs $O_0$–$O_4$ vary progressively from "10000" to "11110". Over this range the output on the line 30 is such as to maintain the transistor 50 constantly full "on". This is provided by directing a "1" to the steering input $O_4$ of the gate 78 so as to turn both transistors 54 and 50 full "on". At the same time, the inverter 80 operates to provide an enabling input to the gate 76 which directs the pulse duration modulated signal from the line 74 through the gate 76 to the input of the control transistor 36. Over the aforementioned range, the chopper transistor 32 is operated in a pulse mode, i.e., intermittently "on" and "off" and the "on" time is progressively increased in response to increasing speed selection signals from the transducer device 64.

When the output signal combination from the microprocessor 68 reaches "01111", the change in the steering signal $O_4$ inverts or complements the condition of the gates 76 and 78 and directs the time-duration-modulated signal to the transistor 54. Since the transistors 50 and 54 respond inversely to the time-duration-modulated signal as do the transistors 36,38, and 32, the result of increasing speed selection signals from device 64 to progressively decrease the "on" time of shunt field circuit while the series field circuit held full "on".

The overall result is to prod the speed characteristic shown in FIG. 2 where series circuit is progressively increasingly pulsed for increasing low speed, high torque operation, and the shunt circuit is regressively pulsed for increasing high speed, low torque operation.

INDUSTRIAL APPLICABILITY

FIG. 5 illustrates the industrial applicability of the circuit of FIG. 3 to an electric powered industrial vehicle 86. The vehicle includes a steering mechanism 88 connected to dirigible wheels 90 and a compound motor 12 connected to traction wheels 92. A manual throttle 64 is connected to the control circuit 24, the output of which is in turn connected to the compound motor 12. A battery 22 provides power to the compound motor 12.

In operation, the operator advances the throttle 64 to operate control circuit 24 in the manner previously described, i.e., to progressively pulse the series winding of the compound motor 12 while holding the shunt circuit full "on" for low speed to mid-range operation and thereafter to regressively pulse the shunt circuit while holding the series field winding full "on" over the high speed operatoring range. The windings of the compound motor 12, being wound on a common magnetic frame, reflect the energy from one circuit to the other during pulsed operation, conserving electrical energy, reducing heat losses, and providing rapid build-up of current in the pulsed circuit as it is switched "on".

We claim:

1. A multiple-range motor speed control system comprising:
   a compound motor having an armature circuit (15), a series winding (14), and a shunt winding (16) the windings (14,16) being magnetically linked in energy transfer relation;

a first current switch (18) in series with the series winding and the armature;

a second current switch (20) in series with the shunt winding;

speed control means (24) for controllably opening and closing the first (18) and second (20) switches, the control means (24) having a first continuous operating range over which the first switch (18) is intermittently opened and closed while the second switch (20) is constantly closed, and a second continuous operating range in which the first switch (18) is constantly closed and the second switch (20) is intermittently opened and closed;

said speed control means (24) comprising means (70,72) for producing time duration modulated waveforms in response to a selected speed and logic means (76,78) for selectively directing the time-duration-modulated waveforms to the first and second switches (18,20);

said logic means including first (76) and second (78) logic gates having outputs (28,30) connected to the first and second switches (18,20) respectively, the time-duration-modulated waveforms being connected to one input of each of the gates (76,78); and said control means (24) further comprising means (68) for producing a range control signal (04) which has one logic level for all speeds in one speed range and another logic level for all speeds in another speed range, means (79) connecting the range control signal to a second input of one of said gates (76,78) and means (80) connecting the inverse of said range control signal to a second input of another of said gates (76,78).

2. Apparatus as defined in claim 1 including first (36,38) and second (54) amplifiers connected between the first and second gates (76,78) respectively, and the first and second current switches (18,20).

3. Apparatus as defined in claim 1 wherein said speed control means includes a speed selector (26), a multi-bit digital signal generator which generates a multi-bit digital signal according to the setting of said speed selector (26) and means (70,72) for converting the digital signal to the time-duration-modulated waveform.

4. A multi-range motor speed control system comprising:

a compound motor having an operating speed range of zero to full speed, said motor having an armature circuit, a series winding, and a shunt winding, the series and shunt windings being magnetically linked in energy transfer relation;

a first current switch in series with the series winding and the armature;

a second current switch in series with the shunt winding; and speed control means having a speed demand input by which an operator may specify operating speed from zero to full speed and including means for producing a time-duration-modulated waveform in response to a selected speed, digital logic means including first and second logic gates having outputs connected to said first and second switches, respectively, for controllably directing the time-duration-modulated waveforms to the first and second switches and for operating said switches in both duty cycle and full-on modes, the time-duration-modulated waveforms being connected to one input of each of the gates, program means for correlating speed demands to said switch operating modes such that from zero to an inter-mediate speed the first switch is operated with a progressively increasing duty cycle while said second switch is continously operated in said full-on mode and from said intermediate speed to full speed the first switch is operated continuously in said full-on mode while the second switch is operated with a progressively decreasing duty cycle and for producing a range control which has one logic level for all speeds in the other range, means connecting the range control signal to a second input of one of said gates, and means connecting the inverse of said range control signal to a second input of another of said gates.

5. Apparatus as defined in claim 4 including first (36,38) and second (54) amplifiers connected between the first and second gates (76,78), respectively, and the first and second current switches (18,20).

6. A multiple-range motor speed control system comprising:

a compound motor having an operating speed range of zero to full speed, said motor having an armature circuit, a series winding, and a shunt winding, the series and shunt windings being magnetically linked in energy transfer relation;

a first current switch in series with the series winding and the armature;

a second current switch in series with the shunt winding; and speed control means having a speed selector by which an operator may specify operating speed from zero to full speed, a multi-bit digital signal generator which generates a multi-bit digital signal according to the setting of said speed selector, means for converting the digital signal to a time-duration-modulated waveform, digital logic means including first and second logic gates having outputs connected to the first and second switches, respectively, for selectively directing the time-duration-modulated signal to the first and second switches and for operating said switches in both cycle and full-on modes, the time-duration-modulated waveform being connected to one input of each of the gates, program means for correlating speed demands to said switch operating modes such that from zero to an intermediate speed the first switch is operated with a progressively increasing duty cycle while said second switch is continuously operated in said full-on mode and from said intermediate speed to full speed the first switch is operated continuously in said full-on mode while the second switch is operated with a progressively decreasing duty cycle and for producing a range control signal which varies in level according to the selected speed range, means connecting the range control signal to a second input of one of said gates, and means connecting the inverse of said range control signal to a second input of another of said gates.

7. Apparatus as defined in claim 6 wherein said speed selector (26) is an analog output device, and the control means (24) includes signal means (66) for converting the analog output signal to a digital signal.

* * * * *